(12) United States Patent
Westerman et al.

(10) Patent No.: US 10,185,432 B2
(45) Date of Patent: Jan. 22, 2019

(54) TOUCH DETECTION AT BEZEL EDGE

(71) Applicant: Apple Inc., Cupertino, CA (US)

(72) Inventors: Wayne Carl Westerman, San Francisco, CA (US); Ari Y. Benbasat, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/294,401

(22) Filed: Oct. 14, 2016

(65) Prior Publication Data

US 2017/0031511 A1 Feb. 2, 2017

Related U.S. Application Data

(62) Division of application No. 14/192,536, filed on Feb. 27, 2014, now Pat. No. 9,477,331.

(60) Provisional application No. 61/832,703, filed on Jun. 7, 2013.

(51) Int. Cl.
*G06F 3/041* (2006.01)
*G06F 3/0488* (2013.01)
*G06F 3/044* (2006.01)

(52) U.S. Cl.
CPC ............ *G06F 3/0416* (2013.01); *G06F 3/041* (2013.01); *G06F 3/044* (2013.01); *G06F 3/0488* (2013.01); *G06F 2203/04108* (2013.01)

(58) Field of Classification Search
CPC ........ G06F 3/0416; G06F 3/041; G06F 3/044; G06F 3/0488; G06F 2203/04108
See application file for complete search history.

(56) References Cited

U.S. PATENT DOCUMENTS

| 5,483,261 | A  | 1/1996  | Yasutake        |
| 5,488,204 | A  | 1/1996  | Mead et al.     |
| 5,825,352 | A  | 10/1998 | Bisset et al.   |
| 5,835,079 | A  | 11/1998 | Shieh           |
| 5,880,411 | A  | 3/1999  | Gillespie et al.|
| 6,188,391 | B1 | 2/2001  | Seely et al.    |
| 6,310,610 | B1 | 10/2001 | Beaton et al.   |
| 6,323,846 | B1 | 11/2001 | Westerman et al.|
| 6,690,387 | B2 | 2/2004  | Zimmerman et al.|
| 7,015,894 | B2 | 3/2006  | Morohoshi       |

(Continued)

FOREIGN PATENT DOCUMENTS

| CN | 101529368 A  | 9/2009 |
| JP | 2000-163031  | 6/2000 |

(Continued)

OTHER PUBLICATIONS

Lee, et al., "A Multi-Touch Three Dimensional Touch-Sensitive Tablet," Computer Systems Research Institute, University of Toronto, Toronto, CA, Apr. 1985, 5 pages.

(Continued)

*Primary Examiner* — Sahlu Okebato
(74) *Attorney, Agent, or Firm* — Morgan, Lewis & Bockius LLP

(57) ABSTRACT

This relates to a method of extrapolating proximity information to generate a border column or row of touch nodes (also known as touch pixels) and then fitting an ellipse to the contact patch including the extrapolated border touch nodes. Additionally, a contact can be identified as a thumb based on both its major axis and its distance to an edge of the touch sensing surface.

15 Claims, 9 Drawing Sheets

(56) References Cited

U.S. PATENT DOCUMENTS

| | | | |
|---|---|---|---|
| 7,184,064 | B2 | 2/2007 | Zimmerman et al. |
| 7,643,010 | B2 | 1/2010 | Westerman et al. |
| 7,663,607 | B2 | 2/2010 | Hotelling et al. |
| 7,855,718 | B2 | 12/2010 | Westerman |
| 8,479,122 | B2 | 7/2013 | Hotelling et al. |
| 2002/0015064 | A1 | 2/2002 | Robotham et al. |
| 2006/0197753 | A1 | 9/2006 | Hotelling |
| 2008/0309629 | A1* | 12/2008 | Westerman ............. G06F 3/038 345/173 |
| 2009/0174679 | A1 | 7/2009 | Westerman |
| 2011/0127092 | A1 | 6/2011 | Lu |
| 2012/0019469 | A1 | 1/2012 | Westerman |
| 2012/0032891 | A1 | 2/2012 | Parivar |
| 2012/0032979 | A1 | 2/2012 | Blow et al. |
| 2012/0235937 | A1 | 9/2012 | Sleeman et al. |
| 2012/0313861 | A1* | 12/2012 | Sumi .................... G06F 3/0416 345/173 |
| 2013/0120278 | A1 | 5/2013 | Cantrell |
| 2014/0362001 | A1 | 12/2014 | Westerman et al. |

FOREIGN PATENT DOCUMENTS

| | | |
|---|---|---|
| JP | 2002-342033 | 11/2002 |
| KR | 20130030173 A | 3/2013 |

OTHER PUBLICATIONS

Rubine, "Combining Gestures and Direct Manipulation," Information Technology Center, School of Computer Science, Carnegie Mellon Univeristy, Pittsburgh, PA, May 3-7,1992, 2 pages.

Rubine, "The Automatic Recognition of Gestures," submitted in partial fulfillment of the requirements for the degree of Doctor of Philosophy in Comuter Science at Carnegie Mellon University, Dec. 1991, 285 pages.

Westerman, "Hand Tracking, Finger Identification, and Chordic Manipulation on a Multi-Touch Surface," Apr. 1999, 364 pages.

Office Action, dated Nov. 3, 2015, received in U.S. Appl. No. 14/192,536, 16 pages.

Final Office Action, dated Mar. 30, 2016, received in U.S. Appl. No. 14/192,536, 13 pages.

Notice of Allowance, dated Aug. 12, 2016, received in U.S. Appl. No. 14/192,536, 7 pages.

Office Action, dated Oct. 25, 2016, received in Australian Patent Application No. 2014275440, which corresponds with U.S. Appl. No. 14/192,536, 3 pages.

Office Action, dated Oct. 19, 2016, received in Korean Patent Application No. 10-2015-7036976, which corresponds with U.S. Appl. No. 14/192,536, 4 pages.

International Search Report and Written Opinion, dated Sep. 26, 2014, received in International Patent Application No. PCT/US2014/036447, which corresponds with U.S. Appl. No. 14/192,536, 15 pages.

International Preliminary Report on Patentability, dated Dec. 8, 2015, received in received in International Patent Application No. PCT/US2014/036447, which corresponds with U.S. Appl. No. 14/192,536, 10 pages.

Office Action, dated Jan. 9, 2017, received in Australian Patent Application No. 2014275440, which corresponds with U.S. Appl. No. 14/192,536, 3 pages.

Notice of Allowance, dated Mar. 20, 2017, received in Australian Patent Application No. 2014275440, which corresponds with U.S. Appl. No. 14/192,536, 3 pages.

Certificate of Patent, dated Jul. 13, 2017, received in 2014275440, which corresponds with U.S. Appl. No. 14/192,536, 1 page.

Office Action, dated Jun. 1, 2017, received in Chinese Patent Application No. 201480032100.0, which corresponds with U.S. Appl. No. 14/192,536, 5 pages.

Notice of Allowance, dated Dec. 13, 2017, received in Chinese Patent Application No. 201480032100.0, which corresponds with U.S. Appl. No. 14/192,536, 3 pages.

Notice of Allowance, dated Jun. 27, 2017, received in Korean Patent Application No. 2015-7036976, which corresponds with U.S. Appl. No. 14/192,536, 4 pages.

Patent, dated Jul. 4, 2017, received in Korean Patent Application No. 2015-7036976, which corresponds with U.S. Appl. No. 14/192,536, 3 pages.

Patent, dated Feb. 23, 2018, received in Chinese Patent Application No. 201480032100.0, which corresponds with U.S. Appl. No. 14/192,536, 4 pages.

* cited by examiner

TOUCH DETECTION AT BEZEL EDGE

RELATED APPLICATION

This application is a divisional of U.S. application Ser. No. 14/192,536, filed Feb. 27, 2014, which claims priority to U.S. Provisional Application Ser. No. 61/832,703, filed Jun. 7, 2013, which are incorporated herein by reference in their entirety.

FIELD OF THE DISCLOSURE

This relates generally to electronic devices with touch sensing capabilities.

BACKGROUND OF THE DISCLOSURE

In a touch sensing system, a proximity image may be obtained from a touch sensing surface, and the image may be segmented into a plurality of patches, each corresponding to a contact on or near the touch sensing surface. An ellipse may be fit to each of the plurality of patches. The parameters of the ellipse may be used to identify the contact patches and generate input. However, when a contact patch is on the edge of a proximity image, a fitted ellipse may not accurately represent the sensed touch object, some of which may be past the edge of the touch sensing surface.

SUMMARY OF THE DISCLOSURE

This relates to a method of extrapolating proximity information to generate a border column or row of touch nodes (also known as touch pixels) and then fitting an ellipse to the contact patch including the extrapolated border touch nodes. Additionally, a contact can be identified as a thumb based on both its major axis and its distance to an edge of the touch sensing surface.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Although examples disclosed herein may be described and illustrated herein primarily in terms of capacitive touch sensing and proximity sensing, it should be understood that the examples are not so limited, but are additionally applicable to other touch sensing technologies, including those that sense only force and/or use resistive touch sensing. For example, a "proximity image" as discussed herein may be an image of capacitance, an image of resistance, and/or an image of force, among other possibilities. Additionally, although examples are primarily discussed in terms of columns, the methods disclosed herein can be also used in terms of rows.

In a touch sensing system, a proximity image may be obtained from a touch sensing surface, and the image may be segmented into a plurality of patches, each corresponding to a contact on or near the touch sensing surface. An ellipse may be fit to each of the plurality of patches. The parameters of the ellipse may be used to identify the contact patches and generate input. For example, a contact patch may be identified as a thumb based on a length of a major axis of the fitted ellipse. However, when a contact patch is on the edge of a proximity image, a fitted ellipse may not accurately represent the sensed touch object, some of which may be past the edge of the touch sensing surface.

Figure 1A:
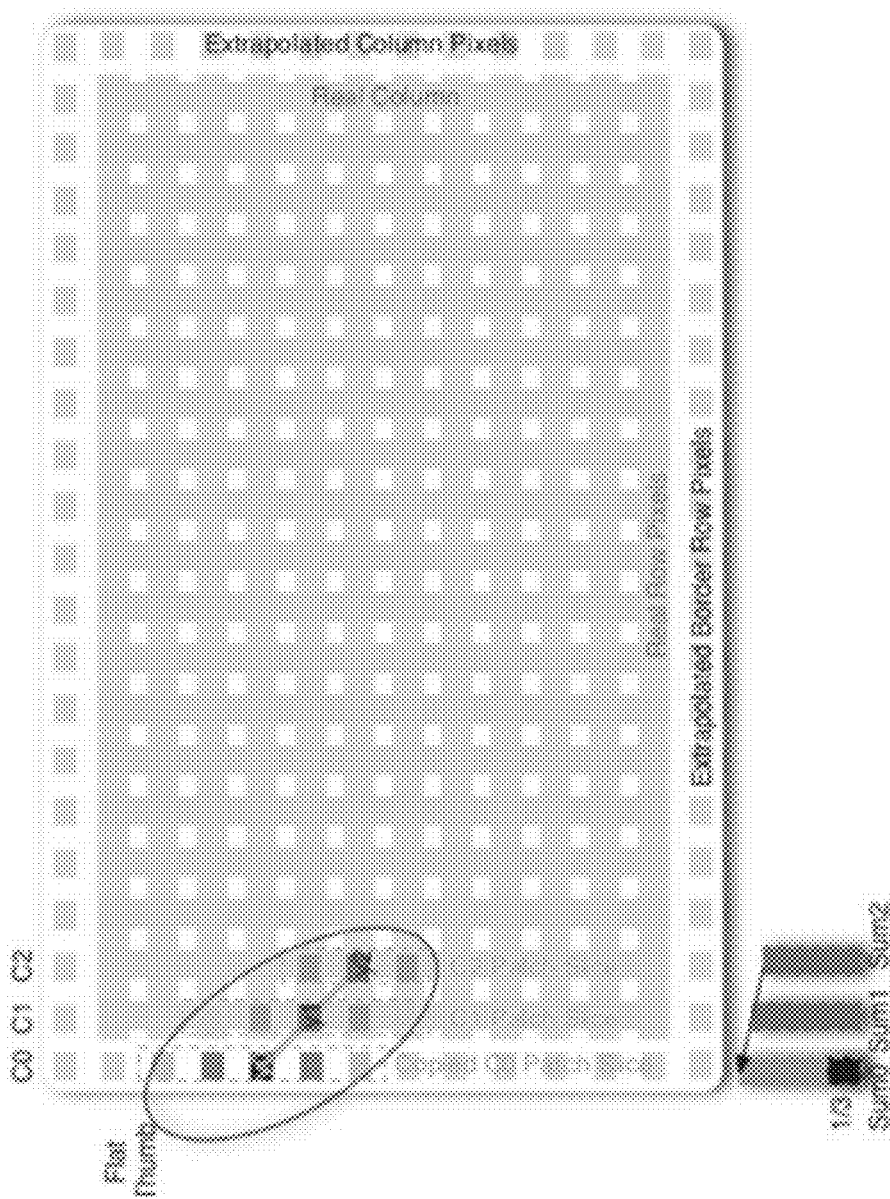
FIGS. 1A and 1B illustrate exemplary proximity images including extrapolated border nodes according to examples of the disclosure.
Figure 1B:
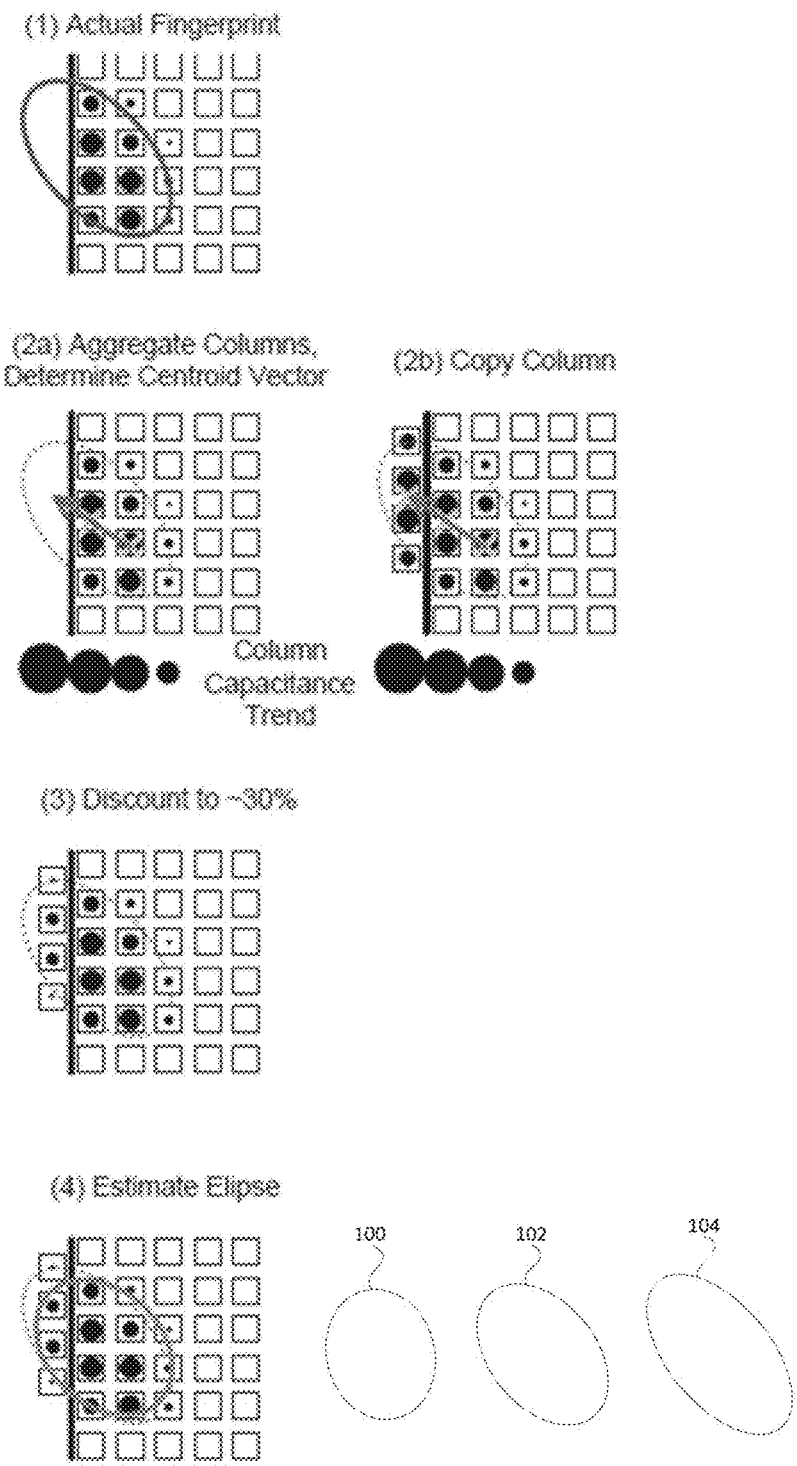

FIGS. 1A and 1B illustrate a method of extrapolating proximity information to generate a border column or row of touch nodes (also known as touch pixels) and then fitting an ellipse to the contact patch including the extrapolated border touch nodes.

In FIG. 1A, an outline of a thumb is shown and the touch nodes of the contact patch corresponding to the thumb are shown in edge column C1 and adjacent column C2. The centroids y1 and y2 of columns C1 and C2, respectively, can be calculated and extrapolated to determine y0, an extrapolated centroid for a border column C0. The touch nodes in column C1 of the thumb patch can be copied into column C0 and shifted so that the centroid is at y0. Additionally, the sums Sum1 and Sum 2 of the touch nodes in columns C1 and C2, respectively, of the thumb patch can be calculated and extrapolated to determine Sum0 and the touch nodes copied to column C0 can be appropriately scaled based on the extrapolated Sum0. In some examples, the touch nodes in column C0 can be further scaled down (in this case 1/3) to discount for uncertainty in the extrapolation.

In FIG. 1B, the algorithm is illustrated and described in terms of a proximity image of capacitance. That is, each touch node is a capacitance value that represents proximity of a contact to that touch node. FIG. 1B also illustrates at (1) how a fingerprint that overlaps the edge of a touch sensing surface can create a misleading proximity image. At (2a)-(4) the outline of the actual fingerprint is shown as a dotted line. After extrapolating border pixels, the solid-line ellipse estimated at (4) more accurately represents the actual fingerprint shown at (1).

FIG. 1B also illustrates a trivial ellipse 100 estimated from the initial touch nodes without extrapolation, an extrapolated ellipse 102 estimated from the touch nodes including the additional border nodes added through extrapolation, and the actual fingerprint outline 104. The trivial ellipse 100 has a shorter major axis and a longer minor axis, and its orientation points closer to the top of the proximity image than the ellipse of the actual fingerprint outline 104. By contrast, the extrapolated ellipse 102 has a longer major axis than the trivial ellipse 100, and its orientation is much closer to the orientation of the actual fingerprint outline 104. As can be seen, including the extrapolated border nodes allows for an estimated ellipse with parameters more accurate to the sensed touch object.

Figure 2:
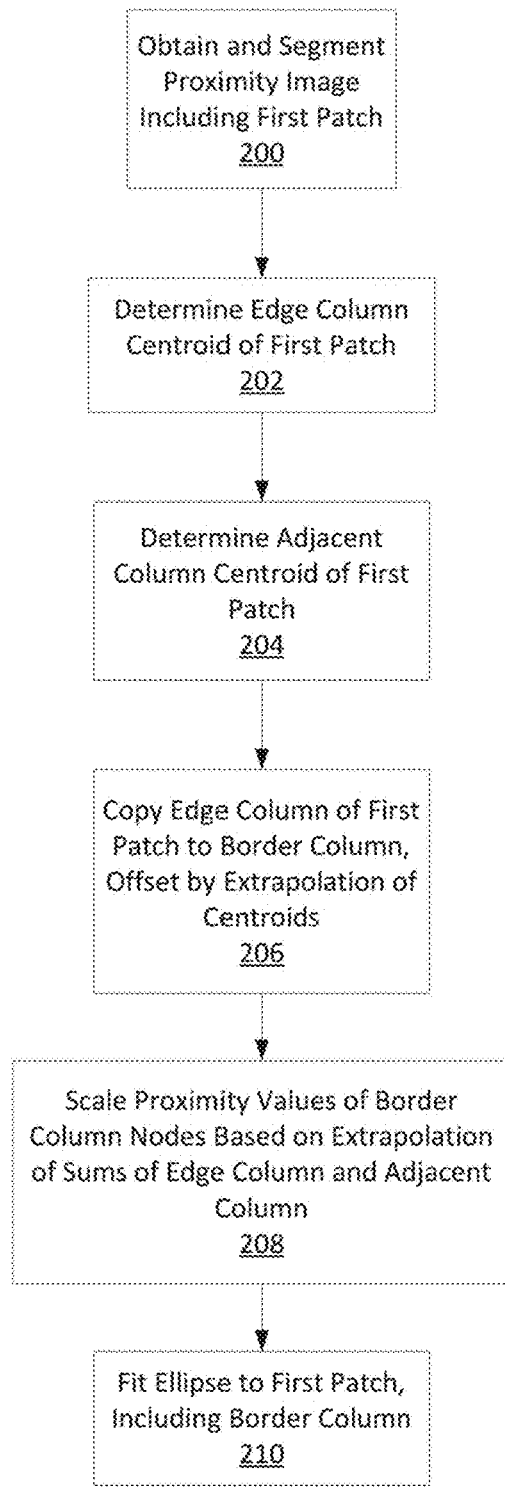
FIG. 2 illustrates an exemplary method of extrapolating border nodes for fitting an ellipse according to examples of the disclosure.

FIG. 2 illustrates an exemplary method of extrapolating border nodes for fitting an ellipse according to examples of the disclosure. A proximity image may be obtained and segmented into a plurality of patches (200). A first patch of the plurality may include one or more touch nodes in an edge column of the proximity image. Additionally, the first patch may include one or more touch nodes in a column adjacent to the edge column.

An edge column centroid of the one or more touch nodes of the first patch in the edge column may be determined (202). A centroid calculation is similar to a center of mass calculation. For example, a centroid can be calculated as a weighted average of the positions of the one or more touch nodes, each position being weighted by the relative proximity value of the touch node at that position. An adjacent column centroid of the one or more touch nodes of the first patch in the adjacent column may be determined in a similar manner (204).

The one or more touch nodes of the first patch in the edge column may be copied into a border column and offset by an extrapolation of the edge column centroid and the adjacent column centroid (206). In some examples, the centroids may be extrapolated by subtracting the adjacent column centroid from the edge column centroid to obtain a shift value. The touch nodes copied into the border column may then be shifted based on the shift value. In some examples, the shift value may be an integer or may be rounded to an integer so that each of the touch nodes may be trivially shifted based on the shift value.

In some examples, the shift value may not be an integer and shifting the copied touch nodes in the border column includes interpolating the touch nodes based on the shift value. For example, if the shift value is 0.6, then for each touch node 60% of the proximity value of the touch node may be shifted up to the next touch node and 40% of the proximity value may remain in the touch node. The remaining 40% may be added to the 60% of the below touch node that is shifted up. In some examples, other methods of interpolating the touch nodes based on a non-integer shift value may be used.

The one or more touch nodes of the first patch in the edge column may be summed to obtain an edge sum. This can include summing the proximity values of the one or more touch nodes. In a similar fashion, the one or more touch nodes of the first patch in the adjacent column may be summed to obtain an adjacent sum. The touch nodes in the border column may then be scaled based on an extrapolation of the edge sum and the adjacent sum (208). The touch nodes in the border column may be scaled such that the sum of the proximity values of the touch nodes in the border column is equal to the extrapolation of the edge sum and the adjacent sum. In some examples, the extrapolation may be a linear extrapolation of the trajectory of the adjacent sum to the edge sum. In other examples, the extrapolation may be a logistic extrapolation of the trajectory of the adjacent sum to the edge sum, such as an extrapolation based on a sigmoid function.

An ellipse may be fit to the first patch including the touch nodes of the border column (210). In some examples, fitting an ellipse may include determining parameters of the ellipse, such as a major axis, a minor axis, and an angle of orientation of the ellipse.

As discussed above, a contact may be identified as a thumb based on the length of the major axis of an ellipse fit to the contact. However, a contact that overlaps the edge of the touch sensing surface may have a shorter major axis and thus it may not be able to be identified as a thumb until most of the contact moves onto the touch sensing surface.

Figure 3:
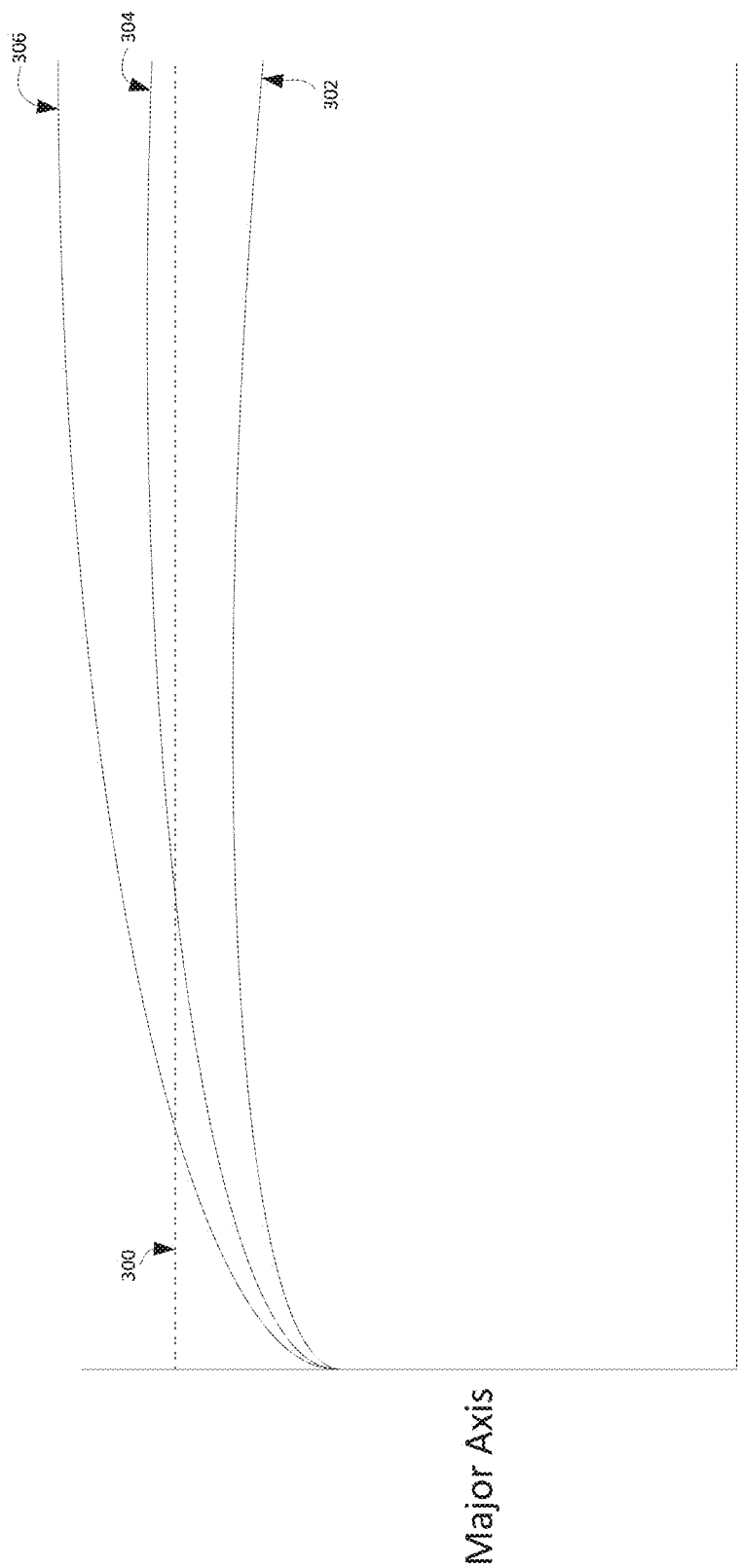
FIG. 3 illustrates a graph of major axis of a contact versus distance from an edge of a touch sensing surface according to examples of the disclosure.

FIG. 3 illustrates a graph of a major axis of a contact versus distance from an edge of a touch sensing surface. When a contact is right on the edge of the touch sensing surface, the major axis of the contact is very short, but as the contact moves from the edge and more of the contact touches the surface, the length of the major axis increases until it stabilizes to the actual length of the major axis of the full contact. The dotted line 300 represents a possible threshold major axis length above which the contact may be identified as a thumb. The curve 302 represents the relationship between major axis and distance from the edge for a generic finger contact. The curve 306 represents the relationship between major axis and distance from the edge for a thumb contact.

The curve 304 represents a reference thumb profile that can be used to identify a contact as a thumb. The major axis and the distance from the edge can be monitored for a contact over a series of time steps, and the area between the curve for a contact and the reference thumb profile 304 can be integrated and accumulated. If the integrated value remains positive, as it would with curve 306, then the associated contact can be identified as a thumb. If the integrated value becomes negative, as it would with curve 302, then it can be determined that the associated contact is not a thumb. This method can be fairly robust, because even if a non-thumb contact has an unusually large major axis when it is close to the edge, as it moves away from the edge the major axis will grow slowly and enough negative area will accumulate such that the contact will not be identified as a thumb. In some examples, the integrated value may be accumulated and the contact may not be identified until a time threshold is exceeded or a distance threshold from the edge is exceeded, among other possibilities.

Figure 4:
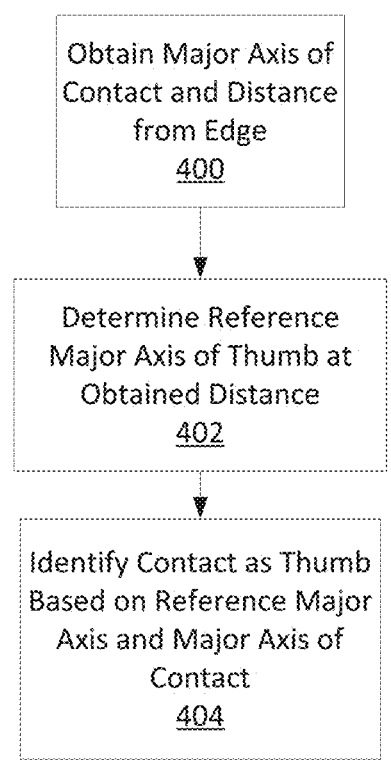
FIG. 4 illustrates an exemplary method of identifying a contact as a thumb according to examples of the disclosure.

FIG. 4 illustrates an exemplary method of identifying a contact as a thumb based on the major axis of the contact and the contact's distance from the edge of the touch sensing surface. A major axis of a contact and a distance of the contact from the edge of the touch sensing surface may be obtained (400).

Based on a thumb profile, a reference major axis of a thumb contact may be determined at the obtained distance (402). A thumb profile may simply be a mapping of distances to major axis values, as illustrated in FIG. 3. Determining the reference major axis can include obtaining the reference major axis from the thumb profile based on the obtained distance of the contact from the edge of the touch sensing surface.

The contact may be identified as a thumb based on the reference major axis and the major axis of the contact (404). For example, the reference major axis and the major axis of the contact may be used to integrate the area between a curve for the contact and a curve for the thumb profile, as described with reference to FIG. 3. If the integrated value is positive, the contact may be identified as a thumb.

In some examples, the reference major axis may be subtracted from the major axis of the contact to obtain an axis difference. In one example, the contact may be identified as a thumb if the axis difference is positive. In other examples, the axis difference may be added to a sum of axis differences from previous time steps. The contact may be identified as a thumb if the sum of axis differences is positive.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 5:
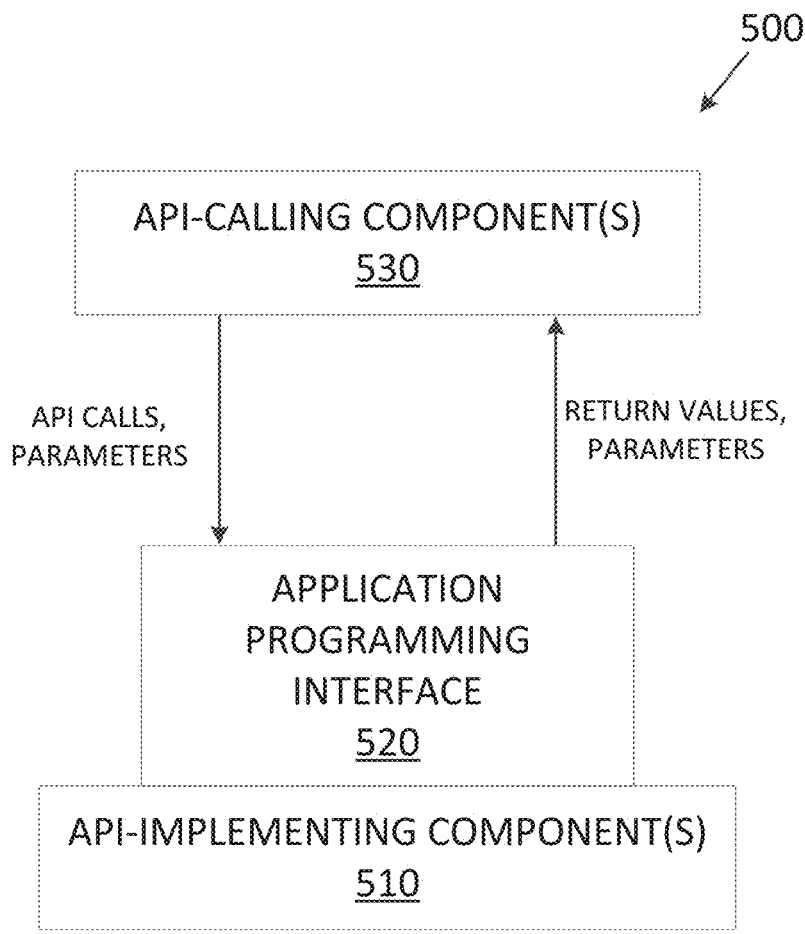
FIG. 5 is a block diagram illustrating an exemplary API architecture, which may be used in some examples of the disclosure.

FIG. 5 is a block diagram illustrating an exemplary API architecture, which may be used in some examples of the disclosure. As shown in FIG. 5, the API architecture 500 includes the API-implementing component 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

It will be appreciated that the API-implementing component 510 may include additional functions, methods, classes, data structures, and/or other features that are not specified through the API 520 and are not available to the API-calling component 530. It should be understood that the API-calling component 530 may be on the same system as the API-implementing component 510 or may be located remotely and accesses the API-implementing component 510 using the API 520 over a network. While FIG. 5 illustrates a single API-calling component 530 interacting with the API 520, it should be understood that other API-calling components, which may be written in different languages (or the same language) than the API-calling component 530, may use the API 520.

The API-implementing component 510, the API 520, and the API-calling component 530 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 6:
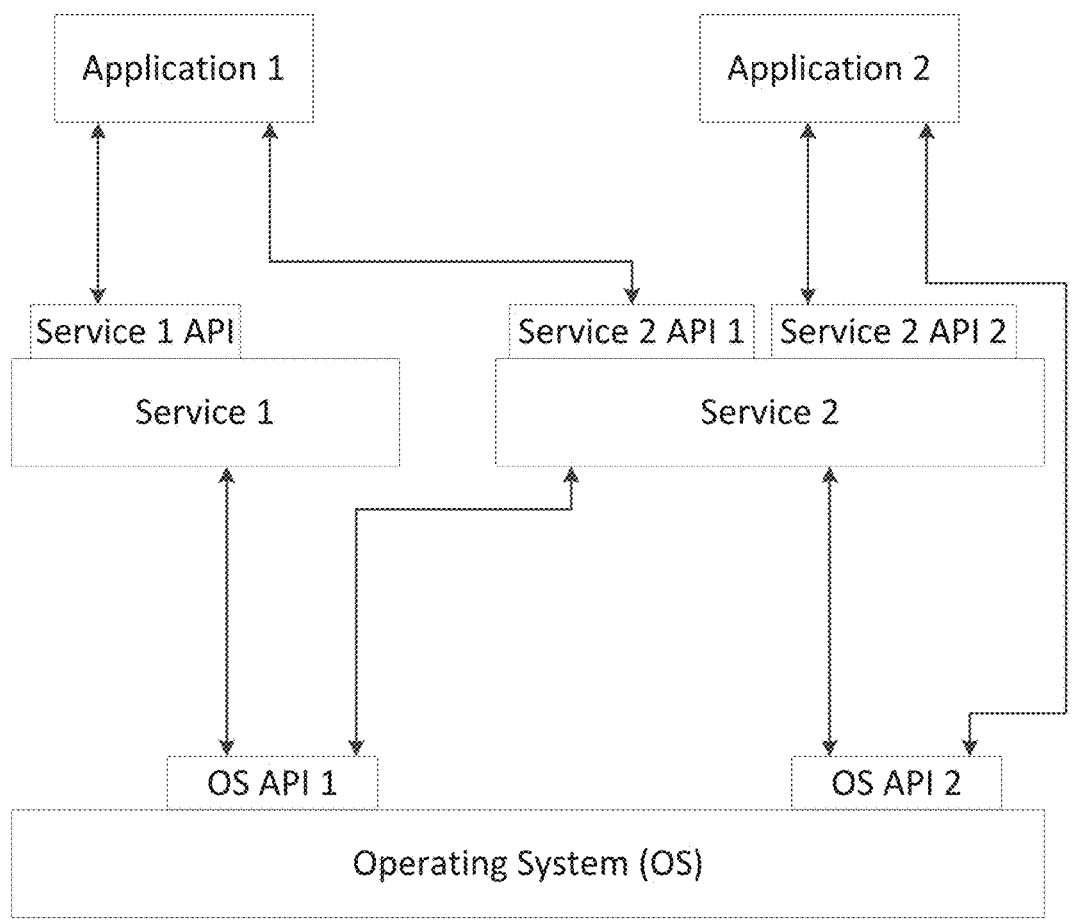
FIG. 6 illustrates an exemplary software stack of an API according to examples of the disclosure.

In the exemplary software stack shown in FIG. 6, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 7:
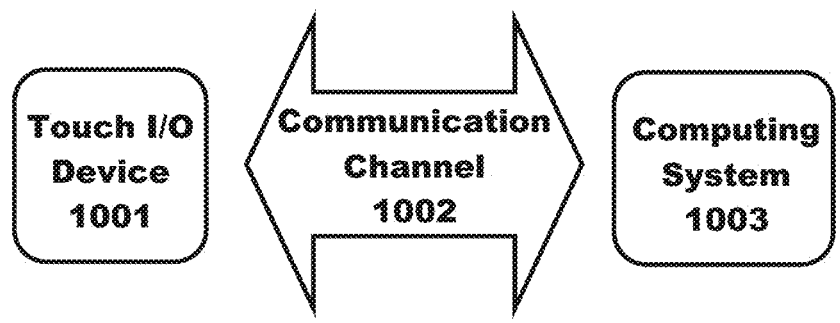
FIG. 7 is a block diagram illustrating exemplary interactions between the touch screen and the other components of the device according to examples of the disclosure.

FIG. 7 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensing panel which is wholly or partially transparent, semitransparent, non-transparent, opaque or any combination thereof Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensing surface for receiving touch input.

In one example, touch I/O device 1001 embodied as a touch screen may include a transparent and/or semitransparent touch sensing panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensing components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 8:
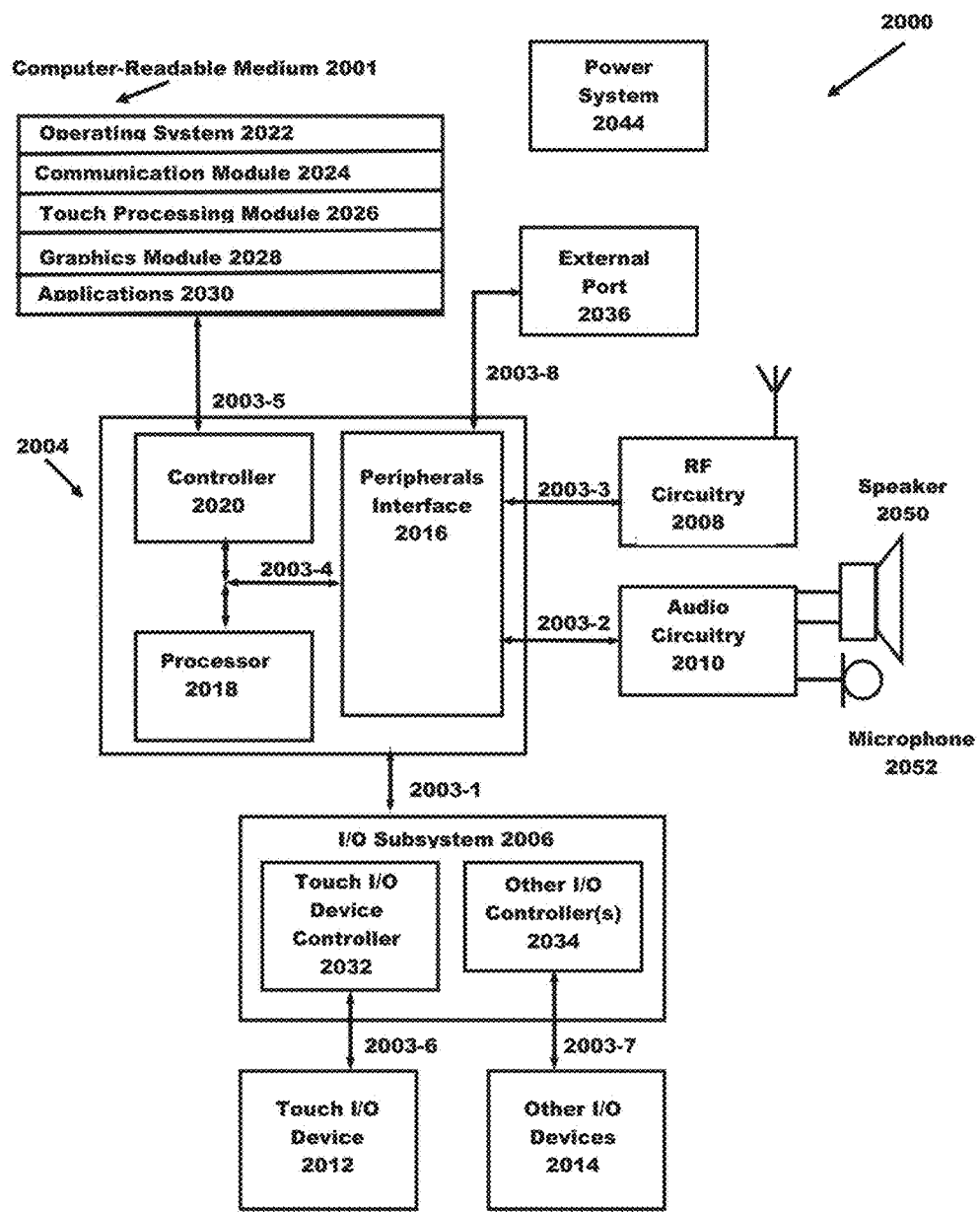
FIG. 8 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 8 is a block diagram of one example of system 2000 that generally includes one or more computer-readable mediums 2001, processing system 2004, I/O subsystem 2006, radio frequency (RF) circuitry 2008, and audio circuitry 2010. These components may be coupled by one or more communication buses or signal lines 2003.

It should be apparent that the architecture shown in FIG. 8 is only one example architecture of system 2000, and that system 2000 could have more or fewer components than shown, or a different configuration of components. The various components shown in FIG. 8 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some examples, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some examples, the software components include operating system 2022, communication module (or set of instructions) 2024, touch processing module (or set of instructions) 2026, graphics module (or set of instructions) 2028, and one or more applications (or set of instructions) 2030. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In examples in which touch I/O device 2012 is a touch sensing display (e.g., touch screen), graphics module 2028 includes components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch sensing surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Examples in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Examples of the disclosure can be advantageous in better recognizing and identifying contact patches near an edge of a touch sensing surface, making use of an electronic device with a touch sensing surface more intuitive and less frustrating to operate.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method of a computing device including a touch sensing surface, the method comprising:
   obtaining a proximity image from the touch sensing surface, the proximity image corresponding to a touch on the touch sensing surface;
   segmenting the proximity image to identify at least a first patch including one or more touch nodes in an edge column of the proximity image, wherein the edge column corresponds to an edge of the touch sensing surface;
   determining an edge centroid of the one or more touch nodes of the first patch in the edge column;
   determining an adjacent centroid of one or more touch nodes of the first patch in an adjacent column of the proximity image, the adjacent column being adjacent to the edge column of the proximity image;
   copying the one or more touch nodes of the first patch in the edge column to a border column in the proximity image, including offsetting the copied touch nodes in the border column based on an extrapolation of the adjacent centroid and the edge centroid; and
   after the copying, using the one or more touch nodes in the border column to determine a touch metric for the touch.

2. The method of claim 1, wherein offsetting the copied touch nodes based on the extrapolation of the adjacent centroid and the edge centroid includes subtracting the adjacent centroid from the edge centroid to obtain a shift value and shifting the copied touch nodes based on the shift value.

3. The method of claim 2, wherein the shift value is a non-integer value and shifting the copied touch nodes based on the shift value includes interpolating the copied touch nodes in the border column based on the shift value.

4. The method of claim 1, further comprising:
   summing the one or more touch nodes of the first patch in the edge column to obtain an edge sum;
   summing the one or more touch nodes of the first patch in the adjacent column to obtain an adjacent sum; and
   scaling the touch nodes in the border column based on an extrapolation of the edge sum and the adjacent sum.

5. The method of claim 4, wherein the extrapolation of the edge sum and the adjacent sum includes one of a linear extrapolation and a logistic extrapolation.

6. A non-transitory computer readable medium, the computer readable medium containing instructions that, when executed, perform a method of a computing device including a touch sensing surface, the method comprising:
- obtaining a proximity image from the touch sensing surface, the proximity image corresponding to a touch on the touch sensing surface;
- segmenting the proximity image to identify at least a first patch including one or more touch nodes in an edge column of the proximity image, wherein the edge column corresponds to an edge of the touch sensing surface;
- determining an edge centroid of the one or more touch nodes of the first patch in the edge column;
- determining an adjacent centroid of one or more touch nodes of the first patch in an adjacent column of the proximity image, the adjacent column being adjacent to the edge column of the proximity image;
- copying the one or more touch nodes of the first patch in the edge column to a border column in the proximity image, including offsetting the copied touch nodes in the border column based on an extrapolation of the adjacent centroid and the edge centroid; and
- after the copying, using the one or more touch nodes in the border column to determine a touch metric for the touch.

7. The non-transitory computer readable medium of claim 6, wherein offsetting the copied touch nodes based on the extrapolation of the adjacent centroid and the edge centroid includes subtracting the adjacent centroid from the edge centroid to obtain a shift value and shifting the copied touch nodes based on the shift value.

8. The non-transitory computer readable medium of claim 7, wherein the shift value is a non-integer value and shifting the copied touch nodes based on the shift value includes interpolating the copied touch nodes in the border column based on the shift value.

9. The non-transitory computer readable medium of claim 6, the method further comprising:
- summing the one or more touch nodes of the first patch in the edge column to obtain an edge sum;
- summing the one or more touch nodes of the first patch in the adjacent column to obtain an adjacent sum; and
- scaling the touch nodes in the border column based on an extrapolation of the edge sum and the adjacent sum.

10. The non-transitory computer readable medium of claim 9, wherein the extrapolation of the edge sum and the adjacent sum includes one of a linear extrapolation and a logistic extrapolation.

11. An electronic device, comprising:
- a touch sensing surface;
- a processor to execute instructions; and
- a memory coupled with the processor to store instructions, which when executed by the processor, cause the processor to perform operations to generate an application programming interface (API) that allows an API-calling component to perform a method of the electronic device, the method comprising:
  - obtaining a proximity image from the touch sensing surface, the proximity image corresponding to a touch on the touch sensing surface;
  - segmenting the proximity image to identify at least a first patch including one or more touch nodes in an edge column of the proximity image, wherein the edge column corresponds to an edge of the touch sensing surface;
  - determining an edge centroid of the one or more touch nodes of the first patch in the edge column;
  - determining an adjacent centroid of one or more touch nodes of the first patch in an adjacent column of the proximity image, the adjacent column being adjacent to the edge column of the proximity image;
  - copying the one or more touch nodes of the first patch in the edge column to a border column in the proximity image, including offsetting the copied touch nodes in the border column based on an extrapolation of the adjacent centroid and the edge centroid; and
  - after the copying, using the one or more touch nodes in the border column to determine a touch metric for the touch.

12. The electronic device of claim 11, wherein offsetting the copied touch nodes based on the extrapolation of the adjacent centroid and the edge centroid includes subtracting the adjacent centroid from the edge centroid to obtain a shift value and shifting the copied touch nodes based on the shift value.

13. The electronic device of claim 12, wherein the shift value is a non-integer value and shifting the copied touch nodes based on the shift value includes interpolating the copied touch nodes in the border column based on the shift value.

14. The electronic device of claim 11, the method further comprising:
- summing the one or more touch nodes of the first patch in the edge column to obtain an edge sum;
- summing the one or more touch nodes of the first patch in the adjacent column to obtain an adjacent sum; and
- scaling the touch nodes in the border column based on an extrapolation of the edge sum and the adjacent sum.

15. The electronic device of claim 14, wherein the extrapolation of the edge sum and the adjacent sum includes one of a linear extrapolation and a logistic extrapolation.

* * * * *